(12) United States Patent
Zhu

(10) Patent No.: US 6,240,172 B1
(45) Date of Patent: May 29, 2001

(54) REMOTE RECONFIGURATION METHOD FOR FEATURE-FUNCTION TELEPHONE SETS

(75) Inventor: Xiqun Zhu, Ocean, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/015,383

(22) Filed: Jan. 29, 1998

(51) Int. Cl.[7] ................................................. H04M 3/42
(52) U.S. Cl. ..................... 379/201; 379/110.01; 379/112; 379/157
(58) Field of Search ................................. 379/157, 201, 379/229, 230, 231, 93.19, 110.01, 93.17, 387

(56) References Cited

U.S. PATENT DOCUMENTS

| | | | |
|---|---|---|---|
| 4,905,274 | * 2/1990 | Cooper et al. | 379/157 |
| 5,195,130 | * 3/1993 | Weiss et al. | 379/93.19 |
| 5,309,509 | * 5/1994 | Cocklin et al. | 379/165 |
| 5,355,404 | * 10/1994 | LeDuc et al. | 379/201 |
| 5,377,261 | * 12/1994 | Baals et al. | 379/201 |
| 5,461,666 | * 10/1995 | McMahan et al. | 379/201 |
| 5,631,954 | * 5/1997 | Evans et al. | 379/201 |
| 5,761,288 | * 6/1998 | Pinard et al. | 379/201 |
| 5,790,648 | * 8/1998 | Bailis et al. | 379/201 |

* cited by examiner

*Primary Examiner*—Fan Tsang
*Assistant Examiner*—Bing Bui
(74) *Attorney, Agent, or Firm*—Fish & Neave; Brajesh Mohan

(57) ABSTRACT

A feature-function telephone capable of requesting and receiving special function programs from a telephone company is provided. The feature-function telephone includes an EEPROM for storing special function programs. Upon a user requesting a special service, a microprocessor determines whether the special purpose program corresponding to the special service requested is resident in the EEPROM. If it is established by the microprocessor that the special purpose program corresponding to the special service requested by the user is resident in the EEPROM, then the microprocessor sends a special function code to the telephone company and subsequently carries out the special service requested. Otherwise, the microprocessor sends a reconfiguration request to the telephone company. A method for remotely reconfiguring a feature-function telephone is also provided.

14 Claims, 3 Drawing Sheets

REMOTE RECONFIGURATION METHOD FOR FEATURE-FUNCTION TELEPHONE SETS

BACKGROUND OF THE INVENTION

This invention relates to techniques for remotely reconfiguring telephone sets. More particularly, this invention relates to remote reconfiguration methods for feature-function telephone sets.

Telephone companies are continually introducing special services as well as upgrading existing services provided over the telephone. For example, some telephone companies offer services that enable the subscriber of the service to determine the telephone number of the person calling. By using feature-function telephones provided by telephone companies, users are able to access various special services (e.g., caller identification, voice mail, mail box, etc.).

Generally, a feature-function telephone comprises function-keys in addition to keys generally present on the keypad, i.e., 1,2,3,4,5,6,7,8,9,0,*, and #. Alternatively, a predetermined combination of keys on the keypad can be used to represent a function-key that is used to access a special service. This predetermined combination is established by telephone companies and may vary from company to company.

Typically, users need to buy or rent feature-function telephone sets or attachments to be coupled to existing telephones from their respective telephone companies in order to access special services. These feature-function telephone sets include special function programs that correspond to special services a user wishes to access. For example, a user subscribing to the caller identification feature offered by a telephone company needs to buy or rent a feature-function telephone or a separate unit which is to be connected to an existing telephone, which enables the user to use the caller identification service offered.

With a continual increase and change in special services provided by telephone companies, the user needs to buy or rent different feature-function telephones or telephone attachments to be able to use new services. Moreover, because services vary from one telephone company to another, there is an additional need to buy or rent new feature-function telephones every time a user moves to a location with a different service provider that does not recognize the special function programs provided by the user's previous provider.

Subsequently, telephone companies need to order different feature-function telephones or different attachments for existing telephones for users subscribing to different services. In turn, telephone manufacturers need to manufacture different feature-function telephones for various telephone companies.

It is therefore an object of the present invention to provide a feature-function telephone capable of being remotely reconfigured, thereby allowing a user access to new or changed services without having to buy or rent different feature-function telephones or telephone attachments.

It is another object of the present invention to provide a feature-function telephone capable of requesting and receiving special function programs from a telephone company, thereby allowing said feature-function telephone to access various special services.

It is yet another object of the present invention to provide a remote reconfiguration method for feature-function telephones that allows a user access to new or changed services without having to buy or rent different feature-function telephones or telephone attachments.

SUMMARY OF THE INVENTION

These and other objects of the invention are accomplished in accordance with the principles of the present invention by providing a feature-function telephone with an electrically erasable programmable read-only memory (EEPROM) and a loading program. When a user tries to use a special function for the first time, the loading program recognizes that the EEPROM does not have the corresponding special function program. The telephone thus sends a reconfiguration request to the telephone central office, which in response reconfigures the user's feature-function telephone.

As part of the reconfiguration process, the user's feature-function telephone receives the special function program the user had requested. The special function program received is subsequently stored in the EEPROM for current as well as later use by the user. The user may experience a slight delay the first time the special function programs are accessed, but thereafter, because the special function program is stored in an EEPROM provided with the user's feature-function telephone, the user does not experience delays in succeeding uses of the special function programs. In this manner, a user's feature-function telephone may store several special function programs that may be accessed by the user.

Upon receiving a special function program, the user's feature-function telephone sends the telephone central office the corresponding special function code and proceeds to carry out the user's request. In the event the user moves to an area serviced by a different telephone company that does not recognize the special function code sent by the user's feature-function telephone to the telephone central office, that telephone central office will initialize the reconfiguration process described above.

Further features of the invention, its nature and various advantages, will be more apparent from the accompanying drawings and the following detailed description of the preferred embodiments.

DETAILED DESCRIPTION OF THE PREFERRED EMBODIMENTS

Figure 1:
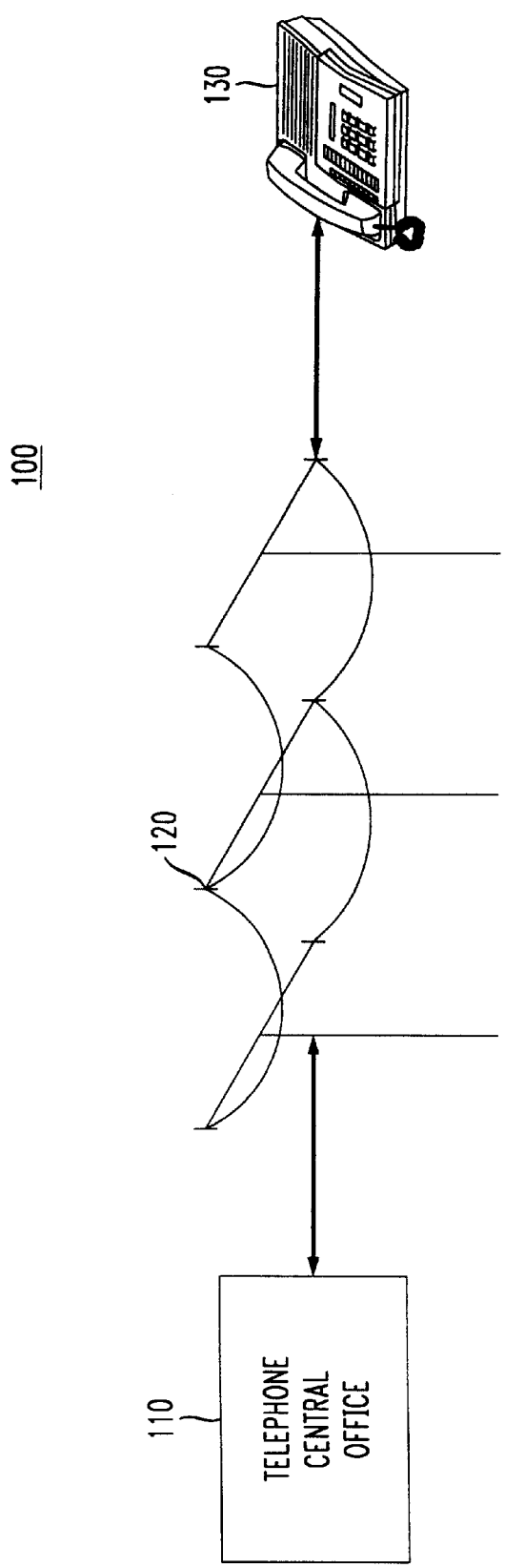
FIG. 1 is a block diagram of an illustrative system for requesting and receiving special function programs in accordance with the present invention.

FIG. 1 shows a preferred embodiment of a system 100 for requesting and receiving special function programs in accordance with the present invention. System 100 comprises a telephone central office 110, a communication network 120, and a feature-function telephone 130. A user is able to access various special services provided by the user's telephone company over communication network 120 by using feature-function telephone 130 or alternatively, a standard telephone coupled to a special function box, the combination having capabilities of feature-function telephone 130.

Feature-function telephone 130 comprises an EEPROM for storing special function programs. If feature-function telephone 130 has the special function program corresponding to the special service requested by the user stored in its EEPROM, then upon receiving the user's request, the feature-function telephone sends a special function code corresponding to the special service requested by the user to telephone central office 110 over communication network 120. After sending the special function code to telephone central office 110, feature-function telephone 130 carries out the special service requested by the user.

However, if the user requests a special service for which feature-function telephone 130 does not have the corresponding special function program resident in its EEPROM, then special function telephone 130 sends a reconfiguration request corresponding to the special service requested by the user to telephone central office 110 over communication network 120. Upon receipt of the reconfiguration request, telephone central office 110 transmits the corresponding special function program over communication network 120 to feature-function telephone 130 to be stored in its EEPROM. The feature-function telephone 130 then carries out the special service requested by the user. Though the user may experience an insignificant delay the first time a special service is requested that does not have a corresponding special function program resident in the EEPROM of the user's feature-function telephone, the reconfiguration process is transparent to the user.

Moreover, if the user moves to a location serviced by a different telephone company, that telephone company may use the above described reconfiguration method to reconfigure the user's feature-function telephone. When a user moves to a location serviced by a telephone company that does not recognize the special function code sent by the user's feature-function telephone when the user requests a special service, the telephone company upon receiving the invalid special function code may request authorization from the user to reconfigure the user's feature-function telephone. This allows users to use the feature-function telephone of the present invention without having to change telephones every time they change services or move.

Figure 2:
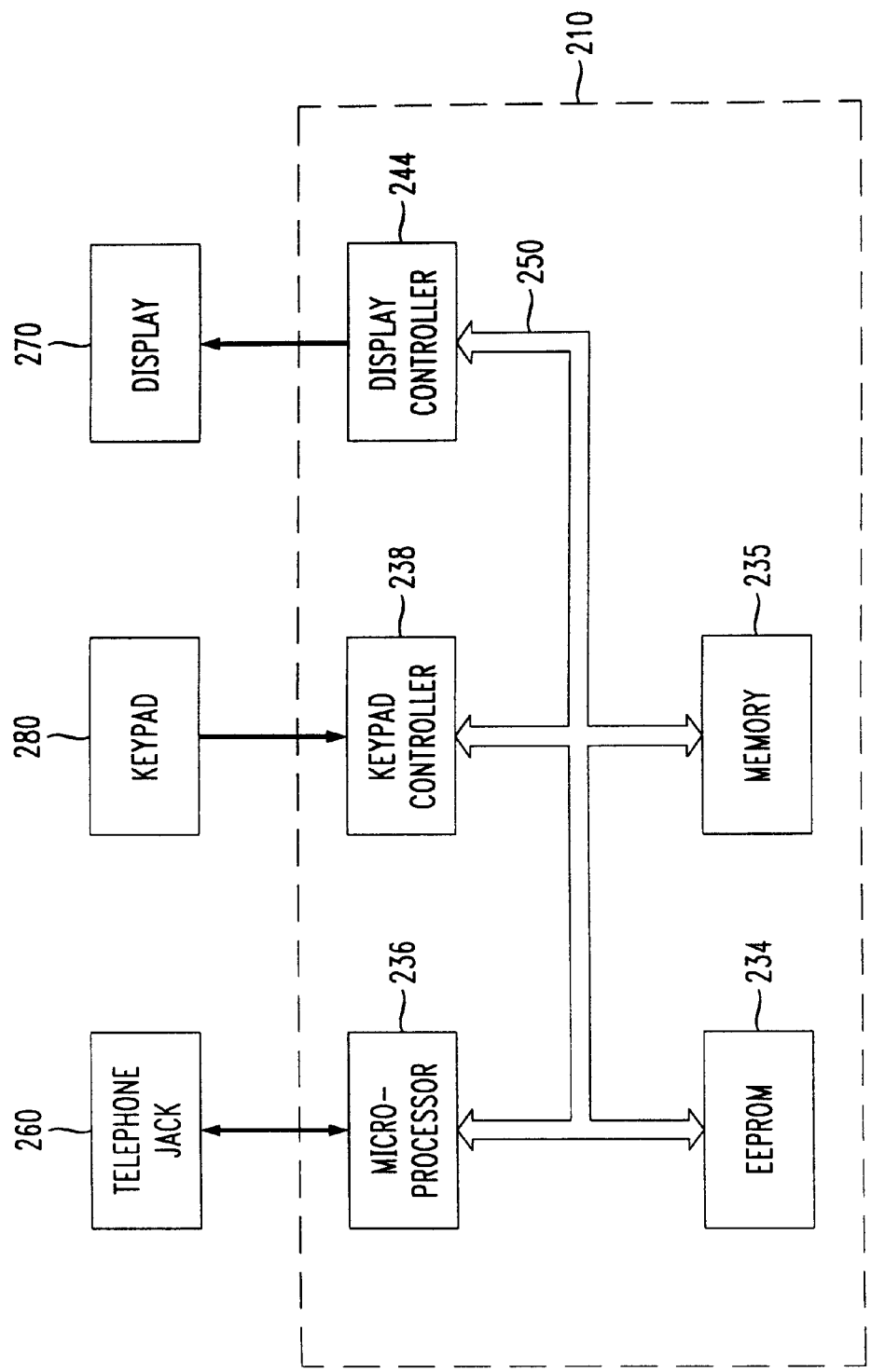
FIG. 2 is a block diagram of an illustrative feature-function telephone in accordance with the present invention.

A block diagram of a preferred embodiment of feature-function telephone 130 is illustrated in FIG. 2. As shown, feature-function telephone 130 (FIG. 1) coupled to telephone jack 260 comprises electronics 210, a display 270, and a keypad 280. Electronics 210 comprises an EEPROM 234, memory 235, a microprocessor 236, a display controller 244, and a keypad controller 238.

Microprocessor 236 performs the central control of electronics 210 by executing software instructions, including but not limited to a loading program. Microprocessor 236 receives and processes inputs from other components in electronics 210, and sends outputs to other components in electronics 210. Microprocessor 236 may be any suitable microprocessor, micro controller, or any other device capable of receiving and processing inputs, and generating outputs. EEPROM 234 is used to store special function programs. Memory 235 is used to store data and software, including but not limited to loading programs, for microprocessor 236 and other components of electronics 210.

Keypad controller 238 monitors inputs from keypad 280 made by the user. Keypad controller 238 buffers these inputs and generates interrupts to microprocessor 236 when those inputs have been received. Based upon interrupts received by microprocessor 236 from keypad controller 238, microprocessor 236 determines whether or not the special function program corresponding to the special service requested by a user is resident in EEPROM 234. If the special function program corresponding to the special service requested by a user is resident in EEPROM 234, then microprocessor 236 sends a special function code to the telephone central office 100 (FIG. 1) and proceeds to carry out the special service requested by the user.

However, if the special function program corresponding to the special service requested by a user is not found to be resident in EEPROM 234 by microprocessor 236, then microprocessor 236 sends a reconfiguration request corresponding to the special service requested by the user to telephone central office 110 (FIG. 1). In the time it takes for the microprocessor 236 to send the reconfiguration request to telephone central office 110 (FIG. 1) and receive the corresponding special function program from telephone central office 110 (FIG. 1), microprocessor 236 may also send control signals to display controller 244 via internal bus 250, causing display controller 244 to display a message on display 270 informing the user that the reconfiguration process is in progress. Once the special function program is received from telephone central office 110 (FIG. 1) it is stored in EEPROM 234 and feature-function telephone 130 (FIG. 1) carries out the special service requested by the user.

If the user moves to a location serviced by a different telephone company that does not recognize the special function code sent by a user's feature-function telephone when the user requests a special service, then that telephone company may prompt the user for authorization to reconfigure the user's feature-function telephone. The telephone company may prompt the user for authorization by, for example, transmitting a pre-recorded voice message, transmitting a data message to be displayed as text on display 270 (FIG. 2), or by connecting the user to a telephone company representative. The user may give authorization to the telephone company by voice or by pressing keys on keypad 280 (FIG. 2) which correspond to the numbers identified by the prompt. The telephone company reconfigures the user's feature-function telephone after receiving authorization from the user. The telephone company may also notify the user of the rate corresponding to the special service requested by the user and may seek the user's authorization prior to performing the special service requested by the user.

Figure 3:
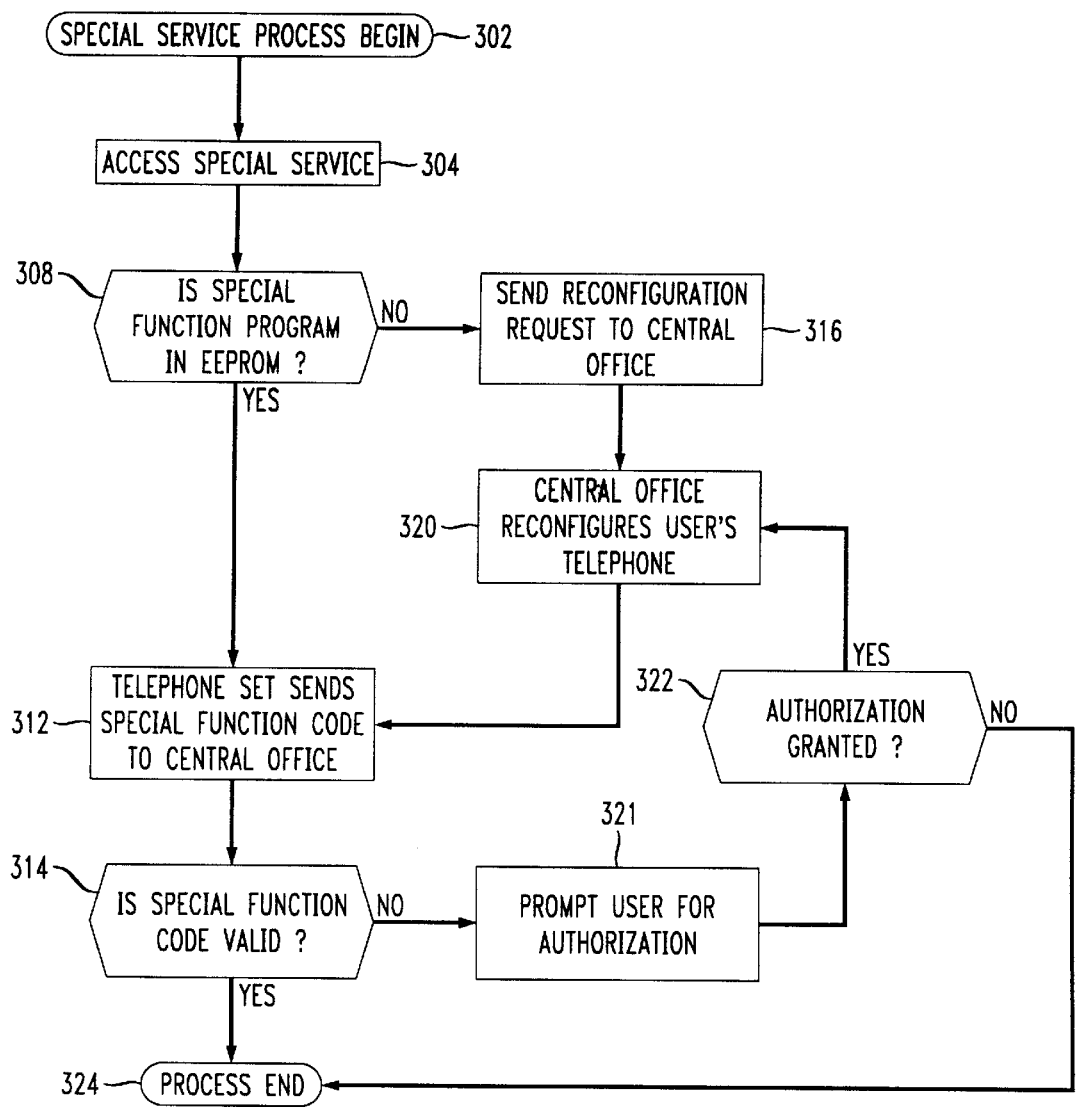
FIG. 3 is a flow chart of steps for carrying out an illustrative embodiment of the remote reconfiguration method for a feature-function telephone in accordance with the present invention.

The steps for carrying out an illustrative embodiment of the remote reconfiguration method used by system 100 (FIG. 1) are illustrated in FIG. 3. As shown, once a user requests a special service at step 304 by pressing the appropriate feature-function keys on keypad 230 (FIG. 2), microprocessor 236 (FIG. 2) determines whether the special function program corresponding to the special service requested is resident in EEPROM 234 (FIG. 2) at step 308. If it is determined at step 308 that the special function program corresponding to the special service requested by the user at step 304 is resident in EEPROM 234 (FIG. 2), then at step 312 microprocessor 236 (FIG. 2) sends the special function code corresponding to the special service requested by the user to the telephone central office 110 (FIG. 1). At step 314 the telephone central office determines whether the special function code received from the user's special function telephone is valid. If the special function code is deemed to be valid at step 314, then the special service requested by the user is carried out ending the process at step 324.

However, if at step 314 it is determined that the special function code received by the telephone central office 110 (FIG. 1) is not valid (e.g., the user has moved to a location served by a different telephone company or the special function program resident in the EEPROM is corrupted), then at step 321 the telephone central office 110 (FIG. 1) prompts the user for authorization to reconfigure the user's feature-function telephone. If authorization is granted by the user at step 322, then the telephone company reconfigures the user's feature-function telephone at step 320. However, if the user does not give authorization at step 322, then the process ends at step 324.

In the event microprocessor 236 (FIG. 2) determines at step 308 that the special function program corresponding to the special service requested by the user at step 304 is not resident in EEPROM 234 (FIG. 2), then microprocessor 236 (FIG. 2) sends a reconfiguration request corresponding to the special service requested by the user to telephone central office 110 (FIG. 1) at step 316. Upon receiving the reconfiguration request, at step 320 telephone central office 110 (FIG. 1) proceeds to reconfigure the user's feature-function telephone by transmitting the special function program corresponding to the special service requested by the user. Upon receiving the special function program from the telephone central office 110 (FIG. 1), microprocessor 236 (FIG. 2) sends the special function code corresponding to the special service requested by the user to telephone central office 110 (FIG. 1) at step 312. The telephone central office 110 (FIG. 1) determines the validity of the special function code received at step 314 and carries out the special service requested if the special function code is found to be valid, ending the process at step 324.

The above described remote reconfiguration method for feature-function telephones may be accomplished by transmissions between the telephone central office and the user's feature-function telephone using FSK (frequency shift keying) signals currently being used for the purpose of caller identification, DTMF (dual-tone modulated frequency) tones, modem signals, or any combinations thereof. By using the above described method, the telephone central office may also regularly update a user's feature-function telephone with upgraded special function programs without requiring the user to buy or rent new feature-function telephones. Consequently, telephone manufacturers need not manufacture different feature-function telephones for various telephone companies, and may just manufacture a standard feature-function telephone in accordance with this invention.

The foregoing is merely illustrative of the principles of this invention and various modifications can be made by those skilled in the art without departing from the scope and spirit of the invention. For example, instead of providing a special function telephone set with the capability of being reconfigured from a remote location, a separate device with similar capabilities may be provided that can be coupled to standard telephone sets provided with an external device interface. Also, telephone companies may periodically update special function programs stored within an EEPROM in a user's feature-function telephone using FSK and without having the user initiate the reconfiguration process.

What is claimed is:

1. A feature-function telephone capable of requesting and receiving telecommunication special function programs from a telephone company allowing said feature-function telephone to access special services, said feature-function telephone comprising:

a keypad that allows a user to submit a request for special services;

a controller coupled to said keypad;

a programmably alterable non-volatile memory device; and a microprocessor that is coupled to said controller, that receives said request for special services and determines whether said telecommunication special function program corresponding to said request is resident in said programmably alterable non-volatile memory device, said microprocessor transmitting a special function code corresponding to said telecommunication special function program to said telephone company if said telecommunication special function program is found resident in said programmably alterable non-volatile memory device and sending a reconfiguration request to said telephone company if said telecommunication special function program is not found to be resident in said programmably alterable non-volatile memory device.

2. The feature-function telephone of claim 1 wherein said programmably alterable non-volatile memory device comprises an EEPROM.

3. The feature-function telephone of claim 1 further comprising a memory device coupled to said microprocessor, said memory device having a loading program resident therein for providing instructions to said microprocessor.

4. The feature-function telephone of claim 1 wherein after sending said special function code corresponding to said request, said microprocessor carries out said request.

5. The feature-function telephone of claim 1 wherein after transmitting said reconfiguration request, said microprocessor waits for said telecommunication special function program corresponding to said request from said telephone company.

6. The feature-function telephone of claim 1 wherein said telecommunication special function program is caller-identification or voice-mail.

7. A method for requesting and receiving telecommunication special function programs from a telephone company using a feature-function telephone, said method comprising:

detecting a special service request made by a user; and processing said special service request, sending a special function code to said telephone company if said processing determines that a telecommunication special function program corresponding to said special service request is resident in a programmably alterable non-volatile memory device and sending a reconfiguration request to said telephone company if said processing determines that said telecommunication special function program corresponding to said special service request is not resident in said programmably alterable non-volatile memory device.

8. The method of claim 7 wherein said special service request is received from inputs made by said user on a keypad.

9. The method of claim 8 wherein said inputs are interpreted by a keypad controller which sends corresponding interrupts to a microprocessor.

10. The method of claim 7 wherein after transmitting said reconfiguration request to said telephone company said microprocessor waits to receive said telecommunication special function program corresponding to said special service request from said telephone company.

11. The method of claim 10 wherein after receiving said telecommunication special function program from said telephone company, said telecommunication special function program is stored in said programmably alterable non-volatile memory device.

12. The method of claim 7 wherein said telecommunication special function program is caller-identification or voice-mail.

13. The method of claim 7 wherein upon receiving an invalid special function code from said feature-function telephone said telephone company prompts said user for authorization to reconfigure said user's feature-function telephone.

14. The method of claim 7 wherein said telephone company notifies said user of rates corresponding to said special service request made by said user.

* * * * *